US009856857B2

(12) United States Patent
Vitale et al.

(10) Patent No.: US 9,856,857 B2
(45) Date of Patent: Jan. 2, 2018

(54) METHOD AND RELEVANT SYSTEM FOR CONVERTING MECHANICAL ENERGY FROM A GENERATOR ACTUATED BY A TURBINE INTO ELECTRIC ENERGY

(71) Applicant: CONSIGLIO NAZIONALE DELLE RICERCHE, Rome (IT)

(72) Inventors: Gianpaolo Vitale, Rome (IT); Marcello Pucci, Rome (IT); Massimiliano Luna, Rome (IT)

(73) Assignee: CONSIGLIO NAZIONALE DELLE RICERCHE, Rome RM (IT)

( * ) Notice: Subject to any disclaimer, the term of this patent is extended or adjusted under 35 U.S.C. 154(b) by 14 days.

(21) Appl. No.: 14/889,308

(22) PCT Filed: May 5, 2014

(86) PCT No.: PCT/IT2014/000119
§ 371 (c)(1),
(2) Date: Nov. 5, 2015

(87) PCT Pub. No.: WO2014/181367
PCT Pub. Date: Nov. 13, 2014

(65) Prior Publication Data
US 2016/0076518 A1    Mar. 17, 2016

(30) Foreign Application Priority Data
May 8, 2013    (IT) .............................. RM2013A0272

(51) Int. Cl.
*F03D 7/04*    (2006.01)
*F03D 9/00*    (2016.01)
(Continued)

(52) U.S. Cl.
CPC ............. *F03D 7/046* (2013.01); *F03D 7/028* (2013.01); *F03D 7/0276* (2013.01); *F03D 9/25* (2016.05);
(Continued)

(58) Field of Classification Search
CPC ......................... F03D 7/046; F05B 2270/709
See application file for complete search history.

(56) References Cited

U.S. PATENT DOCUMENTS 5,083,039 A  *  1/1992  Richardson ........... F03D 7/0272
                                                                    290/44
5,798,631 A  *  8/1998  Spee ..................... F03D 7/0272
                                                                    290/31
(Continued)

OTHER PUBLICATIONS

Maurizio Cirrincione et al: "Sensors-less neural MPPT control of wind generators with induction machines", IECON 2009—35th Annual Conference of IEEE Industial Electronics (IECON2009)—Nov. 3-5, 2009—Porto, Portugal, IEEE, Piscataway, NJ, USA, Nov. 3, 2009 (Nov. 3, 2009), pp. 818-824, XP031629675, ISBN: 978-1-4244-4648-3.
(Continued)

*Primary Examiner* — Viet Nguyen
*Assistant Examiner* — Joseph Ortega
(74) *Attorney, Agent, or Firm* — Harness, Dickey & Pierce, P.L.C.

(57) ABSTRACT

A method and system for converting mechanical energy from a generator operated by a turbine into electric energy to be input into an electric network, comprising the following:
(A) supplying a power electronic converter connectable to input of the generator and to output of the electric network;
(B) supplying an electrical power outputting the generator to the power electronic converter;
(Continued)

(C) adapting the electrical power using the power electronic converter to input the electrical power to the electric network by the following substeps:
(C1) calculating rotation speed of the turbine;
(C2) calculating wind speed moving the turbine;
(C3) calculating reference rotation speed, corresponding to the maximum point of power input to the electric network, using a Maximum Power Point Tracking algorithm;
the method comprising substep (C1) implemented by an algorithm carrying out a virtual encoder, and substep (C2) implemented by training a neural network implementing a virtual anemometer.

7 Claims, 7 Drawing Sheets

(51) Int. Cl.
*F03D 7/02* (2006.01)
*F03D 9/25* (2016.01)

(52) U.S. Cl.
CPC ........ *F03D 9/255* (2017.02); *F05B 2260/821* (2013.01); *F05B 2270/32* (2013.01); *F05B 2270/327* (2013.01); *F05B 2270/709* (2013.01); *Y02E 10/723* (2013.01)

(56) References Cited

U.S. PATENT DOCUMENTS

| | | | |
|---|---|---|---|
| 6,566,764 B2 * | 5/2003 | Rebsdorf | H02P 9/007 |
| | | | 290/44 |
| 9,599,096 B2 * | 3/2017 | Spruce | F03D 7/028 |
| 2003/0071467 A1 * | 4/2003 | Calley | F03D 7/0256 |
| | | | 290/44 |
| 2004/0217596 A1 * | 11/2004 | Feddersen | F03D 7/0224 |
| | | | 290/44 |
| 2007/0085343 A1 * | 4/2007 | Fortmann | F03D 7/0264 |
| | | | 290/44 |
| 2009/0189393 A1 * | 7/2009 | Tyagi | F03D 9/002 |
| | | | 290/44 |
| 2010/0133822 A1 | 6/2010 | Mixter, Jr. | |
| 2010/0133903 A1 * | 6/2010 | Rufer | F02C 6/16 |
| | | | 307/22 |
| 2011/0074151 A1 * | 3/2011 | Burra | H02J 3/24 |
| | | | 290/44 |
| 2011/0215577 A1 * | 9/2011 | Martin Da Silva | F03D 7/028 |
| | | | 290/44 |
| 2012/0051939 A1 * | 3/2012 | Marvin | F03D 1/04 |
| | | | 416/244 R |
| 2012/0310426 A1 * | 12/2012 | Tarnowski | F03D 7/0272 |
| | | | 700/287 |
| 2013/0214533 A1 * | 8/2013 | Hupe | F03B 13/10 |
| | | | 290/43 |

OTHER PUBLICATIONS

Shi, K L et al: "A novel control of a small wind turbine driven generator based on neural networks", Power Engineering Society General Meeting, 2004. IEEE, IEEE, Piscataway, NJ, USA, Jun. 6, 2004 (Jun. 6, 2004), pp. 2000-2006, XP010756290, DOI: 10.1109/PES.2004.1373227, ISBN: 978-0-7803-8465-1.

Mellit, A et al: "Artificial intelligence techniques for photovoltaic applications: A review", Progress in Energy and Combustion Science, Elsevier Science Publishers, Amsterdam, NL, vol. 34, No. 5, Oct. 1, 2008 (Oct. 1, 2008), pp. 574-632, XP022931260, ISSN: 0360-1385, DOI: 10.1016/J.PECS.2008.01.001 [retrieved on Mar. 4, 2008], Section 5.2.7—pp. 621-624.

International Search Report and Written Opinion of the ISA for PCT/IT2014/000119, ISA/EP, Rijswijk, NL, dated Sep. 4, 2014.

Search Report and Written Opinion for Italian Patent Application RM2013000272, the Hague, dated Dec. 5, 2013.

* cited by examiner

METHOD AND RELEVANT SYSTEM FOR CONVERTING MECHANICAL ENERGY FROM A GENERATOR ACTUATED BY A TURBINE INTO ELECTRIC ENERGY

CROSS REFERENCE TO RELATED APPLICATIONS

This application is a 371 U.S. National Stage of International Application No. PCT/IT2014/000119, filed May 5, 2014. This application claims the benefit of and priority to Italian Patent Application No. RM2013A000272, filed May 8, 2013. The disclosures of the above applications are incorporated herein by reference.

The present invention concerns a method and relevant system for converting mechanical energy, from a generator actuated by a turbine, into electric energy.

More in detail, the invention concerns a method and a system of the said type, studied and embodied for converting mechanical energy from a synchronous generator actuated by a turbine, for example eolic, into electric energy to be input into an electric single-phase power network, but it is well apparent like the same is not to be considered limited to this specific use.

The exploitation of the eolic energy is remarkably increased in the past decade resulting in increase of both power installations and domestic use or city surroundings installations.

Particularly, the installations for domestic or city use belong to the eolic microgeneration installation class or "Micro Wind Energy Conversion System" (μWECS) to be connected to low voltage electrical network.

The μWECS conversion systems in city surroundings operate under weak wind conditions, often in turbulent regime, the speed and direction thereof quickly varying. Moreover, the localization in city surroundings results in problems from the esthetic and acoustic as well as encumbrance point of view.

Generally, the systems for converting mechanical energy deriving from eolic turbines and more particularly μWECS systems, need both of very efficient turbines, suitable to extract mechanical energy from the wind, and systems for converting mechanical energy into electric energy. Such systems are optimized in order to operate with low values of wind speed and suitable to respond to fast variations, so as to track the maximum generable power.

The tracking of the maximum generable power traditionally occurs using iterative tracking algorithms of the maximum power point, also named "Maximum Power Point Tracking" (MPPT), which search by attempts the optimal operating point of the energy converting system. Such traditional systems are based on the perturbation of the operating point and corresponding observation of the generated power. Said systems are also named "Perturb & observe" or "Hill-climbing".

Other known systems, on the other hand, are based on the turbine model, but they need of the measurement of the wind speed or turbine rotation speed or both.

Currently systems for converting mechanical energy from a generators operated by eolic turbines into electric energy to be input into an electric network exist, said systems including processors, power electronic components and mechanical sensors, in particular an encoder, for the measurement of the turbine rotation speed and an anemometer, for the measurement of the wind speed.

Often, in combination to the energy conversion systems, neural networks are used. Said neural networks are implemented on processing platforms based on digital signal microprocessors, also named "Digital Signal Processor" (DSP) equipped of additional instructions suitable to optimize some mathematical functions in order to allow the implementation of algorithms that would be instead unsuited from the computational point of view for general-purpose microprocessors.

However, DSP microprocessors process the data in a serial way, therefore in order a single operation to be executed various clock cycles are necessary. Therefore, the effective execution frequency of a single operation is much lower than clock frequency.

It is apparent that the known systems show remarkable disadvantages.

A first disadvantage occurs in the use of iterative MPPT algorithms, which have dead times in operating transients of the maximum power point tracking system resulting in a reduction of the produced energy.

By increasing the tracking speed for the optimal point, oscillations around the operating point occur, vice versa at an algorithm slowing, convergence longer times correspond, that do not allow the system to be always operating at the optimal point.

In particular, the disadvantage of the "Perturb & observe" or "Hill-climbing" algorithms consists in the continuous verification of the operating point, also when the system is already operating at the maximum energy point. Such verification is based on the variation of the operating point also when this coincides with the optimal point. This fact affects the yield as, during the tracking step, the operating point continuously varies.

The disadvantage of the algorithms based on the turbine model consists in the need of the use of at least a mechanical sensor, with the consequent increase of the system realization costs and the reliability decrease of the same system.

Another disadvantage is represented by the use of neural networks implemented by DSP microprocessors, which do not allow to reach good performances and make the neural network implementation difficult and expensive. Moreover, the known neural networks are on-line trained on the base of dynamic changes, concerning the turbine structure, like for example the rotation speed and the wind speed concerning variations.

Finally, a disadvantage of the known systems is represented by the necessity to carry out experimental tests in wind tunnel, resulting in cost increase.

In the light of above, it is, therefore, object of the present invention to realize a method and a system for converting mechanical energy into electric energy always operating in the maximum generable energy point, obtained without the use of iterative algorithms, so as to eliminate the dead times in the MPPT algorithm operation.

Further object of the present invention is that to obtain the values of the mechanical quantities processed by the conversion method, i.e. wind speed and turbine rotation speed, without the use of mechanical sensors like anemometers and/or encoder, with consequent increase of the system robustness and reliability and decrease of the system costs and encumbrance.

Additional object of the present invention is that to use a neural network in order to reproduce the characteristics of the used turbine so as to maximize the collected energy amount, above all in μWECS applications.

Another object of the present invention is that to provide an high convergence speed of MPPT algorithm implementing the neural network on a "Field Programmable Gate Array" (FPGA) named platform, so that the neural network can be also off-line re-trained in order to reproduce turbines with any type characteristic.

Further object of the present invention is that to reproduce the turbine peculiar surfaces, knowledge thereof MPPT algorithm is based on, by simulation with software based on finite elements, without necessarily carrying out experimental tests in wind tunnel, so as to reduce the costs.

Another object of the present invention is to input electric energy into electrical network according to the national and international regulations.

Another object of the present invention is to provide for means necessary for the method carrying out and the apparatuses carrying out such method.

These and other results are obtained according to the invention using a method and a system that solves the problem of the dead times in the transients for the maximum power point tracking in systems for eolic generation using permanent magnet synchronous motors without the use of mechanical speed sensors like encoders and/or anemometers, thus obtaining an increase of the deliverable energy amount in comparison to a traditional system, particularly for low wind speeds and an increment of the system robustness and reliability.

It is therefore a specific object of the present invention a method for converting mechanical energy from a generator operated by a turbine into electric energy to be input into an electric network, comprising the following steps of:

(A) supplying a power electronic converter connectable to the input of said generator and to the output of said electric network;

(B) supplying an electrical power outputting said generator to said power electronic converter;

(C) adapting said electrical power using said power electronic converter to input said electrical power to said electric network by the following substeps:

(C1) calculating the rotation speed of said turbine (T);

(C2) calculating an estimated value of the wind speed moving said turbine;

(C3) calculating the reference rotation speed, corresponding to the maximum point of said power input to said electric network, using a Maximum Power Point Tracking Algorithm (MPPT);

said method being characterized in that said substep (C1) is implemented by an algorithm carrying out a virtual encoder, and said substep (C2) is implemented by training a neural network implementing a virtual anemometer.

Further according to the invention, said virtual encoder, implemented by said substep (C1), is obtained according to the further following substeps:

(C1a) supplying the output voltage of said generator to said power electronic converter, said output voltage having a residual ripple voltage component overlapped to a direct voltage component;

(C1b) increasing the value of said direct voltage component of said output voltage to reach a constant value;

(C1c) converting said constant value into a single-phase alternate voltage value for the connection with said electric network;

(C1d) supplying a band-pass filter for selecting the fundamental frequency of said residual ripple voltage component;

(C1e) evaluating the frequency of said fundamental frequency of said residual ripple voltage component by a zero-crossing algorithm;

(C1f) calculating said rotation speed ($\omega_T$) of said turbine by the formula:

$$\omega_T = \frac{f_{ripple} \cdot \pi}{3p},$$

wherein p is the number of polar pairs of said generator.

Further according to the invention, said virtual anemometer, implemented using said substep C2, is obtained according to following further substeps:

(C2a) training said neural network, in an off-line initial calibration mode of the system, giving to said neural network at least a triad of values of rotation speed, wind speed and total power;

(C2b) supplying said rotation speed value, calculated in said substep (C1f), to the neural network;

(C2c) supplying a value of power $P_T$ to the neural network, wherein $P_T$ is obtained by $P_T = P_{el}/\eta$, and $\eta$ is the efficiency of said electric generator (2);

(C2d) obtaining from the output of said neural network an estimated value of wind speed necessary for the whole energy conversion process.

Preferably according to the invention, said algorithm (MPPT) can calculate the reference rotation speed of said turbine to which the maximum power point corresponds using the formula $$\omega_{T\,ref} = v_{stim} \lambda_{opt}/R$$

Wherein $\lambda_{opt}$ is the optimal value of the known value $\lambda = \omega_T R/v$ wherein R is the radius of said turbine and V is the instantaneous wind speed.

Further according to the invention, said value of reference rotation speed of said turbine is sent to a control system of said converter for regulating the rotation speed of said turbine and to a control system of an inverter in order to control the input of the energy into said electrical network.

Again according to the invention, in said off-line substep C2a, said neural network learns the relationship among said three physical quantities V, $P_T$ and $\omega_T$, and gives in output the result of its training consisting of weights in form of numerical coefficients obtained using the characteristic function of the network itself, and, during the conversion of said mechanical energy into said electrical energy, in said substep C2d, called "recall" step, said weights are used by the neural network for estimating the wind speed in real-time using the ability of said neural network of inverting the function $v_{stim} = f^{-1}(P_T, \omega_T)$ starting from the instant data of $P_T$ and $\omega_T$.

Preferably according to the invention, during said substep C2d weighted sums of Euclidean distances between points are executed, comprising the sets of vectors of input data and corresponding vectors, which constitute the weights of neurons, in a tridimensional space stored by a 3×n sized data matrix, wherein n is the number of neurons of the neural network selected for representing the characteristic data of said turbine.

Again according to the invention, said neural network is of "Growing Neural Gas" (GNG) type and is implemented on a "Field Programmable Gate Array" (FPGA) type platform.

It is a further object of the invention a system for converting mechanical energy from a generator operated by a turbine, into electrical energy to be input into an electric network that can comprise a power electronic converter connectable to the input of said generator from which it receives as input electrical energy in form of a three-phase voltage triad with variable magnitude and frequency, and connectable to the output with said electrical network, to which it supplies voltage with magnitude and frequency equal to those running on said electric network and a current depending from the power deliverable by said turbine, said power electronic converter comprising in turn a rectifier, a boost converter, a single-phase inverter and a passive filter connectable with each other in cascade before powering said electric network; and a control logical unit suitable for tuning said power electronic converter; detecting means of electrical quantities, such as voltage and current that are present inside said power electronic converter, suitable for sending the values of said electrical quantities to said control logic unit, said power electronic converter, control logic unit and detecting means of electrical quantities being configured for executing said method as above described.

Further according to the invention, said detecting means can comprise in particular: a first voltage sensor connectable to the output of said rectifier, a second voltage sensor connectable to the output of said boost converter, a third voltage sensor connectable on said single-phase electric energy network, a first current sensor connectable to the input of said boost converter, a second current sensor connectable to the output to said single-phase inverter.

Preferred embodiments are defined according to dependent claims.

The present invention now will be described by an illustrative but not limitative way, according to preferred embodiments thereof, with particular reference to the figures of enclosed drawings, wherein.

In the various figures like parts will be indicated with like numerical references.

The invention consists of a method and relevant system for converting mechanical energy from a permanent magnet synchronous generator operated by an eolic turbine into electric energy to be input into a single-phase electric network, equipped with a sensorless system for the maximum generable energy tracking, based on the implementation of a "Growing Neural Gas" (GNG) type neural network on a "Field Programmable Gate Array" (FPGA) type processing platform.

Figure 1:
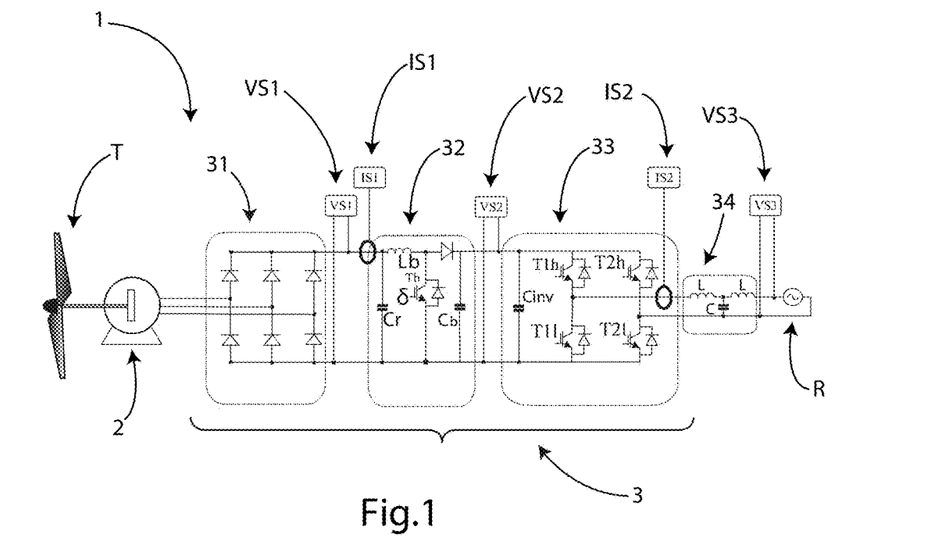
FIG. 1 shows the electrical scheme of the system for the energy conversion according to the present invention.

With reference to FIG. 1, the energy conversion system 1 comprises a synchronous generator 2 whose input is connected to an eolic turbine T and the output is connected to a power electronic converter 3.

The power electronic converter 3 in turn is connected with the input of a single-phase electric energy distribution network R.

The synchronous generator 2 supplies to power electronic converter 3 input electrical energy in form of a three-phase voltage triad with variable magnitude and frequency.

Said energy successively is converted by said power electronic converter 3 into voltage with magnitude and frequency equal to those running on single-phase network R and a current depending from the source deliverable power.

System 1 further comprises a plurality of voltage sensors, particularly a first voltage sensor VS1, a second voltage sensor VS2 and a third voltage sensor VS3 and a plurality of current sensors, particularly a first current sensor IS1 and a second current sensor IS2 for the detection of voltage and current electrical quantities and a control system processing data from said sensors VS1, VS2, VS3, IS1, IS2, and IS3 and controlling said power electronic converter 3 for the tracking of the maximum generable power point, as it will be described in detail below.

The power electronic converter 3 consists of a three-phase not controlled bridge diode rectifier 31 whose output is connected to a boost converter DC/DC 32.

The output of boost converter 32 supplies a bridge single-phase inverter 33 connected to the single-phase network R by a "T" LCL type passive filter 34.

Rectifier 31, starting from three-phase triad to the output of generator 2 supplies a direct voltage having a residual ripple voltage component overlapped to a direct voltage component to the boost converter 32.

This input voltage value to boost converter 32 is variable because of the variations of the turbine T speed.

The boost converter 32 increases the value of said direct voltage available to the output of rectifier 31 to reach a constant value to be sent to single-phase inverter 33 input, that is compatible with the delivery to the single-phase network R so as to supply the maximum generable power from the pair turbine T/generator 2.

The single-phase inverter 33 converts the direct voltage available to the output of boost converter 32 in a single-phase alternate voltage for the connection to the single-phase network R.

The plurality of sensors comprises particularly a first voltage sensor VS1 placed at the rectifier 31 output, a second voltage sensor VS2 placed at the boost converter 32 output, a third voltage sensor VS3 placed on the single-phase network R, a first current sensor IS1 placed at the boost converter input 32 and a second current sensor IS2 placed at the single-phase inverter 33 output.

The signal from sensor VS1 is used to estimate in real-time the turbine rotation speed T using an estimating algorithm, as it will be described in detail afterwards, starting from the residual or "ripple" component overlapped to a direct voltage component The frequency of the residual component is in fact equal to 6 fold the electric frequency of the generator voltage 2, which is proportional to the turbine T rotation speed.

Figure 2:
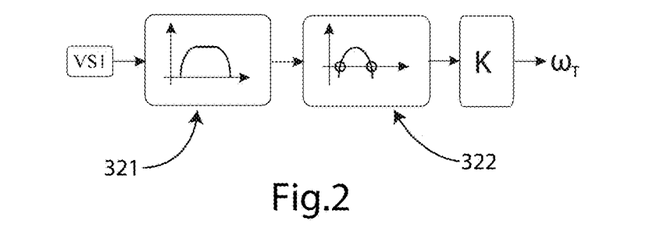
FIG. 2 shows a block diagram of a particular estimating algorithm of the method object of the present invention.

Therefore, as shown in FIG. 2, using a digital pass-band filter 321 the fundamental frequency component of the residual ripple voltage component is extracted.

Successively, a zero-crossing algorithm 322, based on the zero passages of such wave shape, calculates the K period and, consequently, the fundamental frequency of residual ripple voltage component $f_{ripple}$.

The value of $f_{ripple}$ allows the calculation of the turbine T rotation speed $\omega_T$ measured in rad/s, by the formula $$\omega_T = \frac{f_{ripple} \cdot \pi}{3p},$$

wherein p is the number of polar pairs of generator 2.

These operations realize the same functions as an encoder and therefore can be considered like a virtual encoder.

Starting from the knowledge of the turbine peculiar surfaces $P_T=f(\omega_T, v)$, obtainable through simulation with software based on finite element analysis or experimentally in wind tunnel, where $P_T$ is the turbine mechanical power and $\omega_T$ is the turbine real rotation speed, a "Growing Neural Gas" (GNG) type neural network is used.

The neural network is initially trained in the so-called learning step.

Such step is carried out off-line, once at the initial configuration of system 1, using a common table calculator.

In this step, the neural network, receives in input the turbine mechanical power $P_T$, the turbine rotation speed $\omega_T$ and the wind speed V, it learns the relationship among said three physical quantities V, $P_T$ and $\omega_T$ and gives in output the result of its training consisting of weights in form of numerical coefficients obtained using the characteristic function of the network itself.

These weights then are sent to the FPGA processing platform in order to implement on-line the recall step in form of algorithm.

Said algorithm carries out weighted sums of Euclidean distances between points, comprising the sets of vectors of the input data and corresponding vectors, which constitute the weights of the neurons, in a tridimensional space so as to not not to be onerous for the on-line calculation.

This needs a 3×n sized data matrix to be stored, wherein n is the number of neurons of the neural network selected for representing the characteristic data of the turbine.

Figure 3:
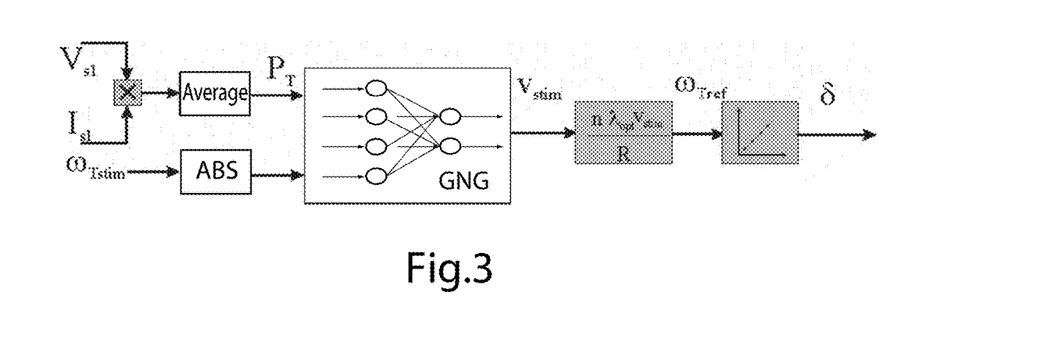
FIG. 3 shows a block diagram of a further particular MPPT algorithm of the method object of the present invention.

During the recall step, the wind speed $v_{stim}$ during the operation of system 1 of FIG. 3 is estimated in real-time.

In this step the ability of GNG neural network is exploited to carry out the inversion of the function $v_{stim}=f^{-1}(P_T, \omega_T)$ starting from the instant data of $P_T$ and $\omega_T$.

Particularly, neural network GNG estimates the wind speed $v_{stim}$ carrying out the calculation of the inverse function $v_{stim}=f^{-1}(P_T, \omega_T)$, such function inverting is realized through the recall step of the neural network.

Therefore the neural network, during the recall step, gives back one of three quantities V, $P_T$ and $\omega_T$ on the base of the value of the other two.

In this particular case this characteristic is exploited in order the $v_{stim}$ to be obtained.

These operations realize the same functions as an anemometer and therefore the same can be considered like a virtual anemometer.

Now with reference to FIG. 3 as to the operation of the algorithm to maximize the generable power or "Maximum Power Point Tracking" (MPPT) that is standardized for the specific used turbine T, so as to always know what must be the maximum power point wherein the energy conversion system 1 must work.

The times by which the energy conversion system 1 is induced to work in correspondence of the maximum power point are only related to dynamics of the control ring of the wind speed V.

The information about the wind speed V is also useful in order to control the energy conversion system 1 in the critical regions, like for example in the cut-off zone.

The power $P_{el}$ delivered by the turbine T is sent into neural network GNG input together with $\omega_T$, previously calculated, in order the wind speed $v_{stim}$ to be estimated as above described.

The power $P_T$ is obtained as $P_T=P_{el}/\eta$, where $P_{el}$ is the energy calculated as mean value of the product of the voltage by the current in output respectively from the first voltage sensor VS1 and from the first current sensor IS1 before the boost converter 32 input and $\eta$ is the yield of the electric generator 2, whose variations based on the turbine speed $\omega_T$ and therefore wind speed V are measured off-line during the step of initial calibration of the energy conversion system 1 and successively saved in a look-up table (LUT1).

Algorithm MPPT, at last, starting from the estimated wind speed $v_{stim}$ in output from the neural network calculates the reference rotation speed $\omega_{Tref}$ of the turbine T necessary in order the maximum energy to be obtained, using the formula: $\omega_{Tref}=v_{stim}\lambda_{opt}/R$, where R is the radius of the turbine T and $\lambda_{opt}$ is the optimal value of the $\lambda=\omega_T R/v$ ratio that is a known amount depending on the turbine T. The $\omega_{Tref}$ value is then sent to the control system.

In such a way the operation of the energy conversion system 1 in correspondence of the maximum power point for every value of the wind speed V is assured.

The control system of the turbine T carries out the control of boost converter 32 and single-phase inverter 33.

Boost converter 32 is controlled for tuning the turbine rotation speed T. The boost converter 32 represents an electronically variable electric load, for the generator 2. The modification of the working point of such generator makes variable the mechanical load on the turbine T, in such a way to induce the turbine T/generator 2 system to work in the maximum power point.

The control system of boost converter 32 receives from MPPT algorithm the speed reference value $\omega_{Tref}$ of the turbine T and delivers in output like control variable the duty-cycle of boost converter 32.

In order to simplify the control system, taking into account that the optimal load of generator 2 is known for each turbine T rotation speed, a relationship based on the interpolation of the data from the look-up table is used to supply directly the duty-cycle starting from $\omega_{Tref}$.

The control of inverter the 33 for the input of the power into the single-phase network R is based, instead, on the measure of the output voltage of boost converter 32 using the second voltage sensor VS2 and on the voltage of the single-phase network R using the third voltage sensor VS3 and on the current delivered by the inverter 32 measured using the second current sensor IS2.

Figure 4:
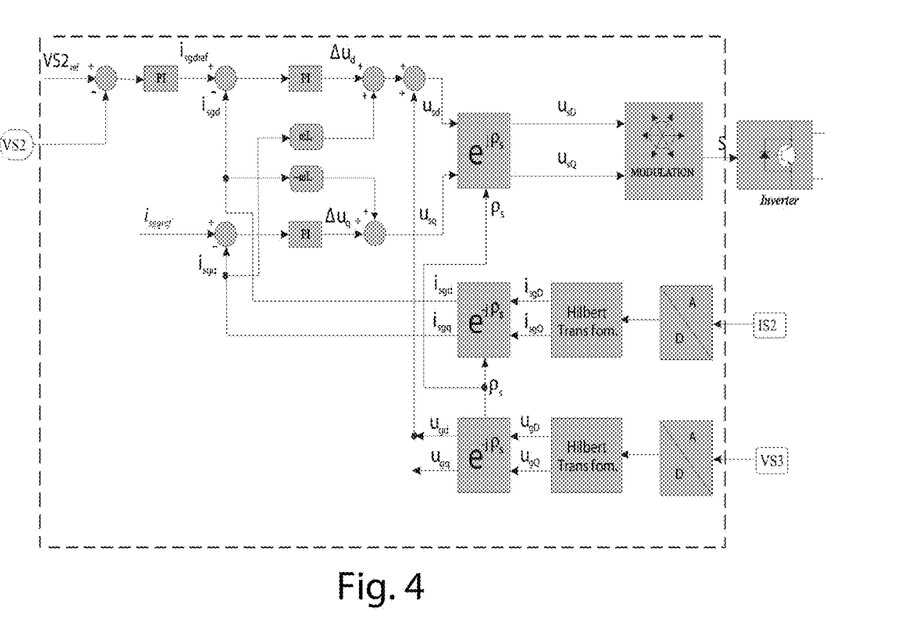
FIG. 4 shows a block diagram of the control system of a part of the FIG. 1 system.

In FIG. 4 the block diagram of the control system operation of the inverter is outlined.

The algorithm implemented by the inverter 33 control system is of Voltage Oriented Control (VOC) type adapted for the single-phase case operating in the following way.

When power from the turbine T is available, the voltage VS2 occurring at the boost converter 32 output tends to increase.

The error with respect to a reference value of this voltage is processed by a proportional/integral controller (PI), whose output $i_{sgdref}$ is the current reference to be input into the single-phase network R, corresponding to the single-phase network R voltage phased component.

The same current quadrature component $i_{sgqref}$ instead is controlled so as to be null, thus corresponding to have a null reactive power exchange. In such a way, the delivery into the network occurs with unitary power factor.

The control system algorithms for the boost converter 32 and inverter 33 are implemented by the same FPGA platform by which GNG neural network is implemented.

Figure 5:
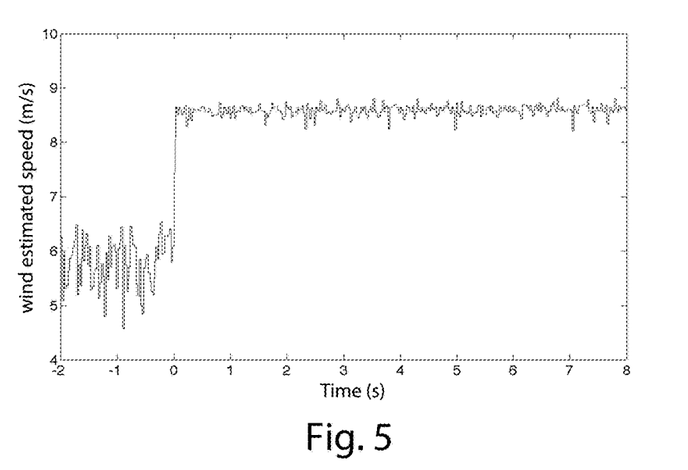
FIG. 5 shows the course of the wind speed estimated by the neural network of the system object of the invention.
Figure 6:
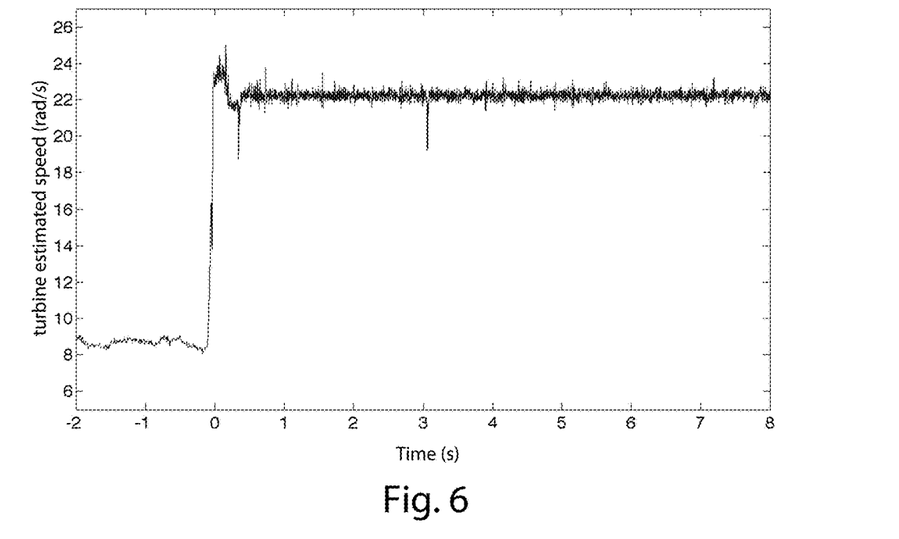
FIG. 6 shows a variation of the eolic turbine speed corresponding to the course of the FIG. 5 speed.
Figure 7:
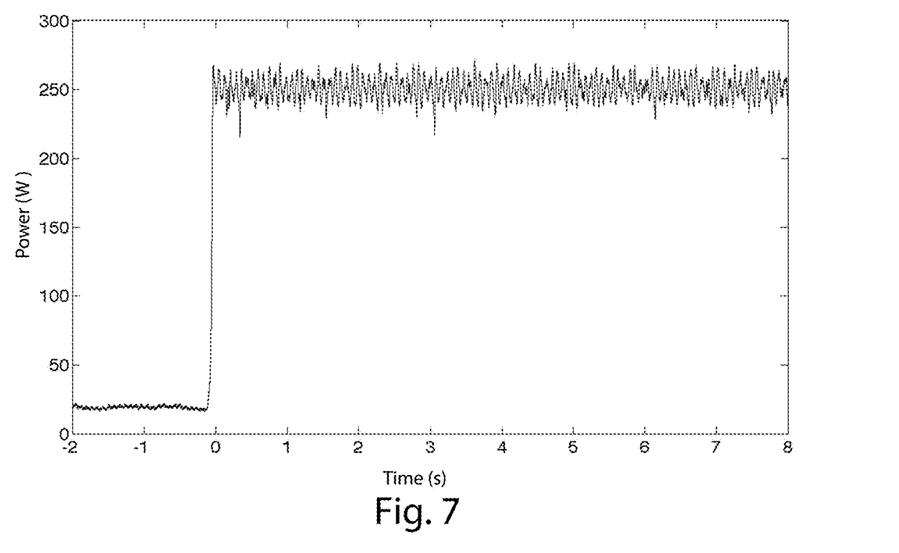
FIG. 7 shows a course of the energy electrical input into electrical network.

Making now reference to FIGS. 5, 6 and 7, some results obtained in laboratory during experimental tests are reported. A sharp variation of the wind speed V from 5 m/s to 9 m/s was simulated.

In particular, FIG. 5 shows the course of the wind speed V estimated by the neural network acting like a virtual anemometer.

FIG. 6 shows the corresponding variation of turbine T speed $\omega_T$, estimated starting from the residual ripple voltage, realizing the virtual encoder.

At last, FIG. 7 shows the course of the electrical power input into the single-phase network R.

The correct operation of the MPPT algorithm can be observed since, as a result of the wind speed V increase, the system 1 increases the rotation speed $\omega_T$ of the turbine T and increases the generated power, reaching without appreciable delays the operation under the maximum power point conditions.

Figure 8:
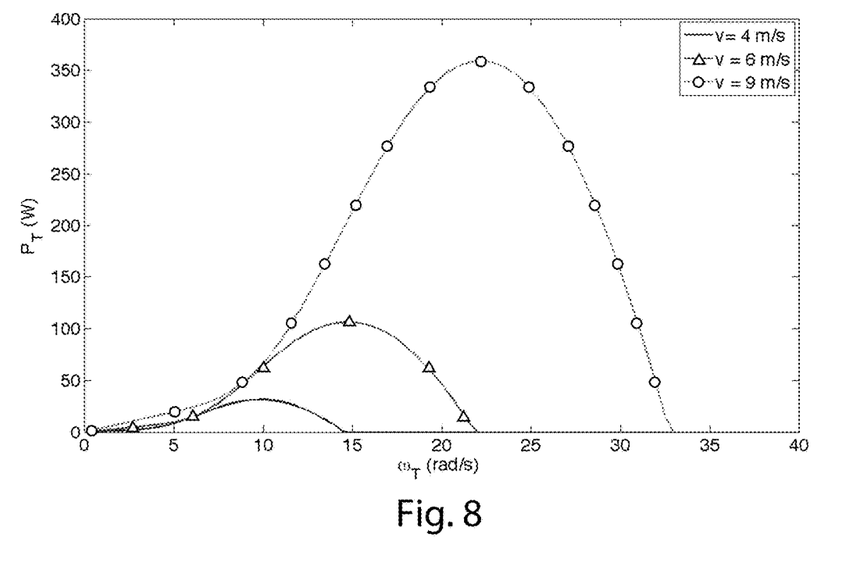
FIG. 8 shows a diagram of characteristic plots wherein x-axis represents the turbine rotation speed and y-axis represents the turbine energy parameterized with the wind speed as resulting during laboratory tests.
Figure 9:
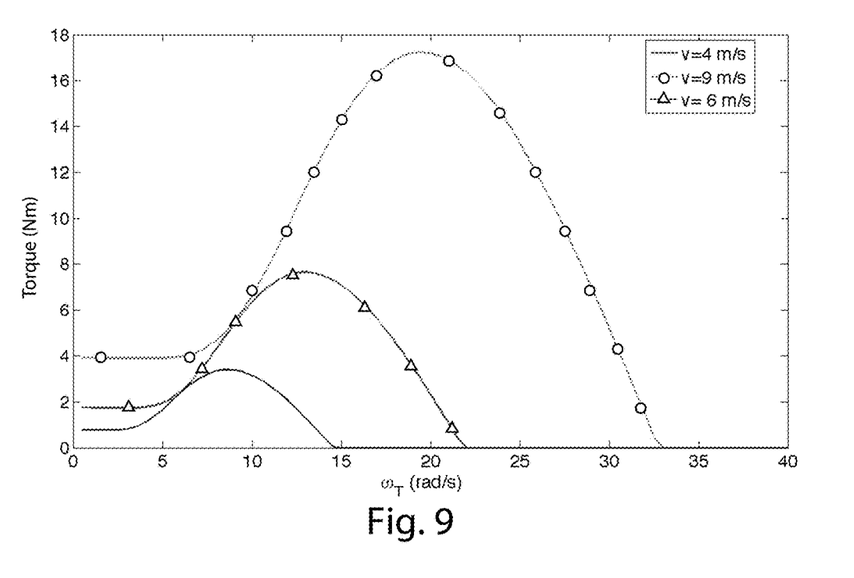
FIG. 9 shows a diagram of further characteristic plots wherein x-axis represents the turbine rotation speed and y-axis represents the turbine torque parameterized with the wind speed as resulting during laboratory tests.
Figure 10:
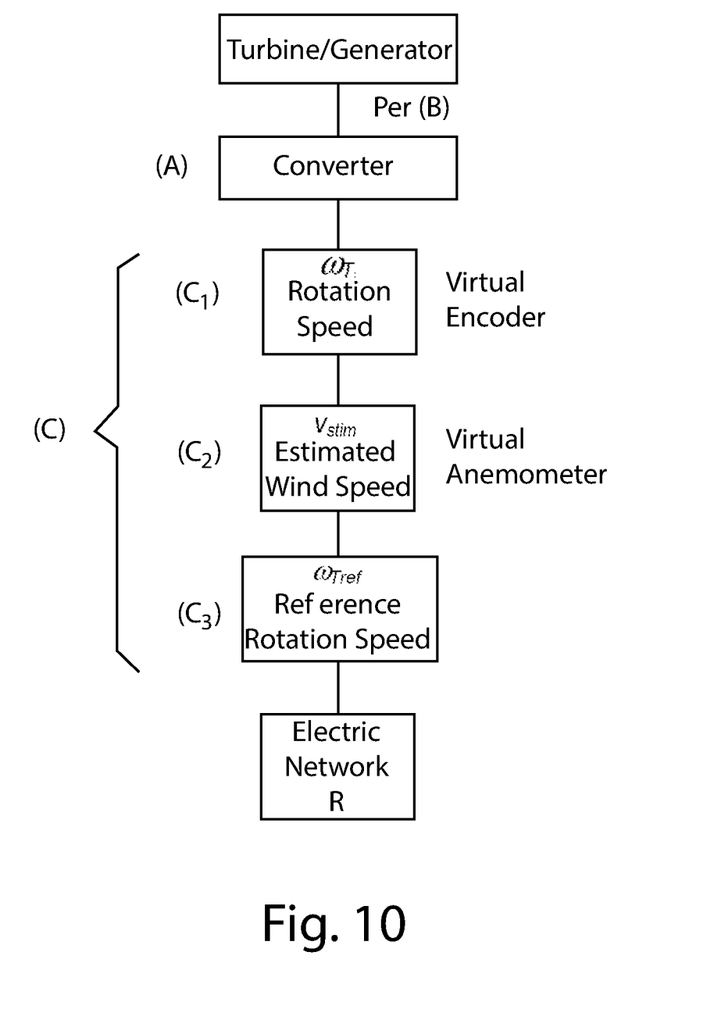
FIG. 10 is a schematic view of a system according to the present invention.
Figure 11:
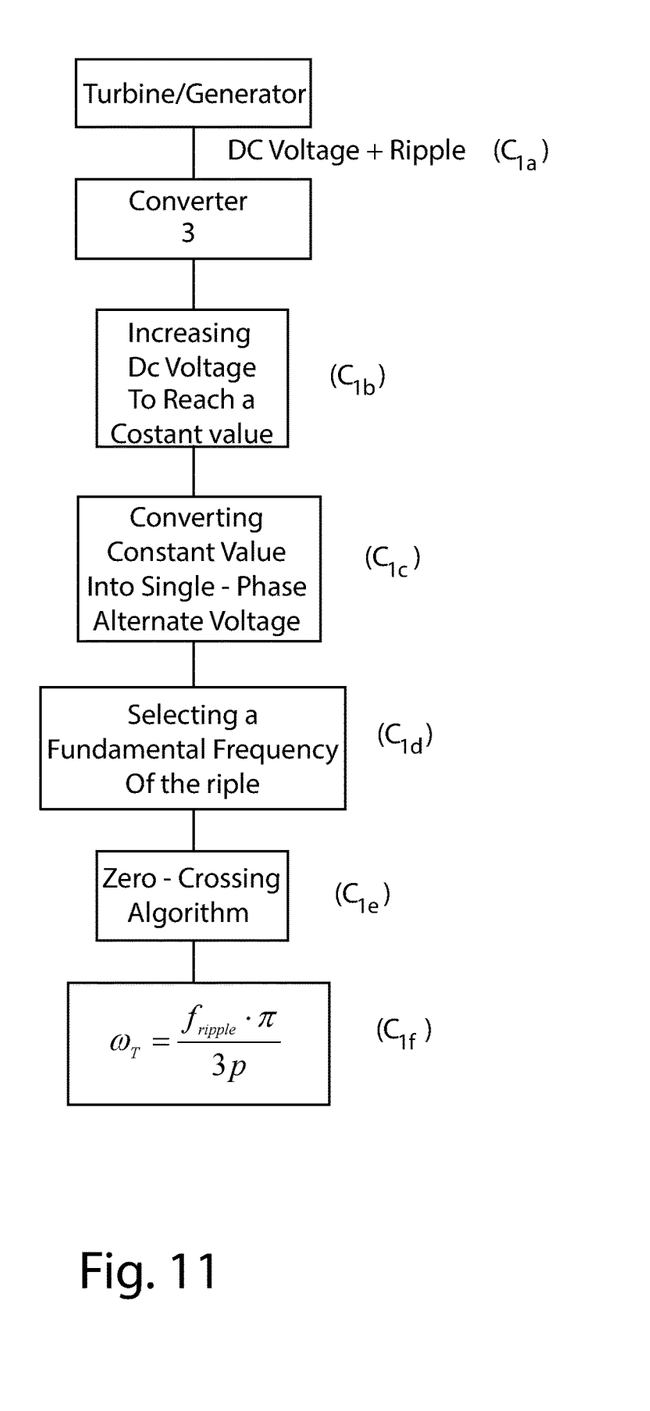
FIG. 11 is a schematic view of a system according to the present invention.
Figure 12:
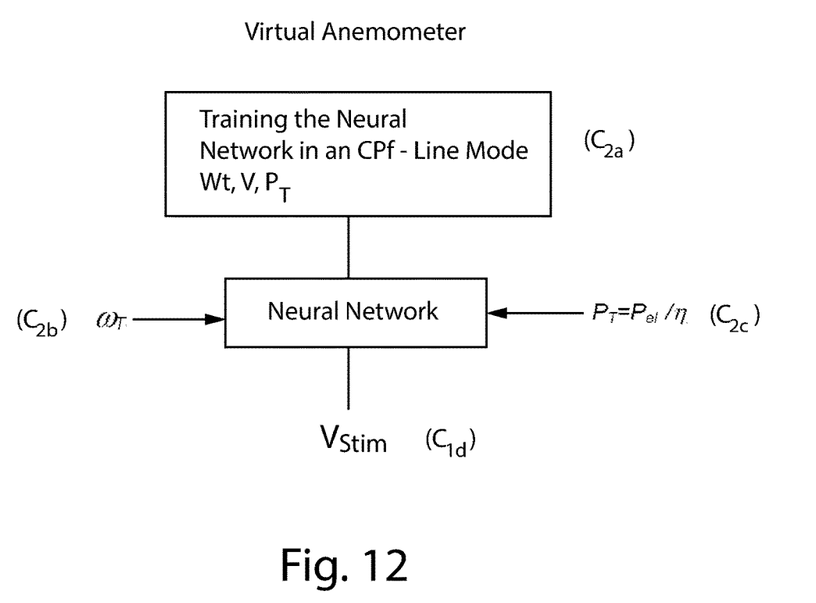
FIG. 12 is a schematic view of a system according to the present invention.

At last, FIGS. 8 and 9 show, respectively, the characteristic power $P_T$ curves of the turbine T as a function of the speed $\omega_T$, parameterized with the wind speed V and the characteristic torque curves of the turbine T as a function the speed $\omega_T$ parameterized with the wind speed V.

It is apparent that the system 1 displays the following advantages.

A first advantage is represented by the FPGA platform displaying the ability to carry out the operations in parallel, so that the various signals are processed almost simultaneously like in an analog circuit, allowing much more elevated operating frequencies to be obtained, theoretically equal to the clock frequency. In such a way, therefore, it is possible the contemporary operation of the various network composing artificial neurons to be obtained, allowing considerable speeds also for very extended neural networks to be reached.

Another advantage is represented by the possibility the system 1 to be used for μWEC applications, thus maximizing the power amount from the turbine T as, for low wind speeds, the knowledge of the turbine characteristics, learned by the neural network, and the increase of the DC voltage level carried out by boost converter 32 assure the keeping of the functionality, so as lower cut-in speeds compared to the traditional systems to be obtained.

A further advantage is represented by the rapidity of the energy conversion system 1 in the convergence towards the maximum power point and the limited use of physical sensors, thus obtaining a robust and at the same time economic system, these requirements are particularly stringent for μWECS systems as they are characterized by a limited inertia having a not large size turbine.

The present invention has been described by an illustrative, but not limitative way, according to preferred embodiments thereof, but it is to be understood that variations and/or modifications could be carried out by those skilled in the art without thus departing from the relevant scope thereof, like defined according to enclosed claims.

The invention claimed is:

1. A method for converting mechanical energy from a generator operated by a turbine into electric energy to be inputted into an electric network, the method comprising the following steps:
   (A) supplying a power electronic converter connectable to an output of the generator and to an input of the electric network;
   (B) supplying an electrical power from the generator output to the power electronic converter;
   (C) adapting the electrical power using the power electronic converter to input the electrical power to the electric network by the following substeps:
      (C1) calculating a rotation speed of the turbine;
      (C2) calculating an estimated value of a wind speed moving the turbine; and
      (C3) calculating a reference rotation speed corresponding to a maximum energy of the turbine for the estimated wind speed using a Maximum Power Point Tracking algorithm;
   wherein substep (C1) is implemented by an algorithm carrying out a virtual encoder, and substep (C2) is implemented by training a neural network implementing a virtual anemometer; and
   wherein a virtual encoder, implemented by substep (C1), is obtained according to the further following substeps:
      (C1a) supplying an output voltage of generator to the power electronic converter, the output voltage having a residual ripple voltage component overlapping a DC voltage component;
      (C1b) increasing the DC voltage component of the output voltage to reach a constant value;
      (C1c) converting the constant value into a single-phase alternate voltage value for the connection with the electric network;
      (C1d) supplying a band-pass filter for selecting a fundamental frequency of the residual ripple voltage component;
      (C1e) evaluating a fundamental frequency of the fundamental frequency of the residual ripple voltage component by a zero-crossing algorithm; and
      (C1f) calculating the rotation speed of the turbine using the formula:

$$\omega_T = \frac{f_{ripple} \cdot \pi}{3p},$$

wherein p is the number of polar pairs of the generator.

2. The method according to claim 1, wherein the virtual anemometer, implemented using substep (C2), is obtained according to the further following substeps:
   (C2a) training the neural network, in an off-line initial calibration mode of the system, giving to the neural network at least a triad of values of rotation speed, wind speed and total power;
   (C2b) supplying the rotation speed value , calculated in substep (C1f), to the neural network;
   (C2c) supplying a value of power $P_T$ to the neural network, wherein $P_T$ is obtained by $P_T=P_{el}/\eta$, and $\eta$ is the efficiency of the electric generator; and
   (C2d) obtaining from the output of the neural network an estimated value of wind speed necessary for the whole energy conversion process.

3. The method according to claim 2, wherein the algorithm calculates the reference rotation speed value of the turbine, corresponding to the maximum power point, using the formula $\omega_{T\ ref} = v_{stim}\lambda_{opt}/R$, wherein $\lambda_{opt}$ is the optimal value of the known value $\lambda = \omega_T R/v$, wherein R is the radius of the turbine and V is an instantaneous wind speed.

4. The method according to claim 3, wherein the reference rotation speed value of the turbine is sent to a control system of the converter for tuning the rotation speed of the turbine and to a control system of an inverter for controlling the input of power into the electric network.

5. The method according to claim 2, wherein in off-line substep C2a, the neural network learns the relationship among three physical quantities V, $P_T$ and $\omega_T$, and outputs the result of its training consisting of weights in form of numerical coefficients obtained using the characteristic function of the network, and during the conversion of the mechanical energy into electrical energy, in recall substep C2d weights are used by the neural network for estimating the wind speed $v_{stim}$ in real-time using the ability of the neural network of inverting the function $v_{stim} = f^{-1}(P_T, \omega_T)$ starting from instantaneous data of $P_T$ and 107 $_T$.

6. The method according to claim 5, wherein during substep C2d weighted sums of Euclidean distances between points are executed, comprising the sets of vectors of the input data and corresponding vectors, which constitute weights of neurons, in a tridimensional space stored by a 3×n sized data matrix, wherein n is the number of neurons of the neural network selected for representing the characteristic data of the turbine.

7. The method according to claim 2, wherein the type of neural network is "Growing Neural Gas".

\* \* \* \* \*